(12) United States Patent
Kim (10) Patent No.: US 12,496,163 B2
(45) Date of Patent: Dec. 16, 2025

(54) METHOD AND COMPUTER PROGRAM FOR DESIGNING STRAIGHTENING ALIGNERS

(71) Applicant: Tae Weon Kim, Seoul (KR)

(72) Inventor: Tae Weon Kim, Seoul (KR)

(*) Notice: Subject to any disclaimer, the term of this patent is extended or adjusted under 35 U.S.C. 154(b) by 1202 days.

(21) Appl. No.: 17/366,044

(22) Filed: Jul. 2, 2021

(65) Prior Publication Data

US 2023/0000594 A1  Jan. 5, 2023

(51) Int. Cl.
*A61C 7/00* (2006.01)
*G06F 30/10* (2020.01)
*G06F 111/06* (2020.01)
*G06F 119/14* (2020.01)

(52) U.S. Cl.
CPC .............. *A61C 7/002* (2013.01); *G06F 30/10* (2020.01); *A61C 7/00* (2013.01); *A61C 2007/004* (2013.01); *G06F 2111/06* (2020.01); *G06F 2119/14* (2020.01)

(58) Field of Classification Search
None
See application file for complete search history.

(56) References Cited

U.S. PATENT DOCUMENTS

| | | | |
|---|---|---|---|
| 9,861,451 B1 * | 1/2018 | Davis | A61C 7/08 |
| 10,052,175 B1 * | 8/2018 | Patel | A61C 7/20 |
| 10,426,575 B1 * | 10/2019 | Raslambekov | A61C 7/002 |
| 11,278,376 B1 * | 3/2022 | Wucher | A61B 5/0088 |
| 2002/0072029 A1 * | 6/2002 | Mao | A61C 7/12 623/16.11 |
| 2012/0225398 A1 * | 9/2012 | Fallah | A61C 7/20 433/8 |
| 2013/0204597 A1 * | 8/2013 | Depta | G06F 30/20 703/6 |
| 2014/0080084 A1 * | 3/2014 | Soo | A61C 7/10 433/7 |
| 2014/0124968 A1 * | 5/2014 | Kim | A61C 7/002 264/16 |
| 2016/0081768 A1 * | 3/2016 | Kopelman | A61C 7/10 433/6 |
| 2016/0120617 A1 * | 5/2016 | Jinkyun | A61B 6/032 433/29 |

(Continued)

FOREIGN PATENT DOCUMENTS

KR  101109424 B1  1/2012

*Primary Examiner* — Akash Saxena
(74) *Attorney, Agent, or Firm* — Bayramoglu Law Offices LLC (57) ABSTRACT

A method and computer program for designing straightening aligners are disclosed. The method for designing straightening aligners according to an exemplary embodiment of the present invention includes generating current alignment information representing a patient's current tooth alignment state, and generating orthodontic alignment information for multiple orthodontic steps that are reached sequentially by correcting the current alignment information, wherein generating the orthodontic alignment information sets the multiple orthodontic steps such that the total sum of orthodontic forces applied to the patient's teeth per one orthodontic step is less than or equal to a preset total sum of orthodontic forces in order to reach a tooth alignment state corresponding to the orthodontic alignment information of each orthodontic step.

18 Claims, 4 Drawing Sheets

(56) References Cited

U.S. PATENT DOCUMENTS

| | | | |
|---|---|---|---|
| 2016/0175068 A1* | 6/2016 | Cai | A61C 7/002 |
| | | | 700/98 |
| 2016/0338799 A1* | 11/2016 | Wu | A61C 7/002 |
| 2017/0319295 A1* | 11/2017 | Bach | A61C 7/145 |
| 2017/0367792 A1* | 12/2017 | Raby | A61C 7/08 |
| 2019/0046298 A1* | 2/2019 | Cinader, Jr. | A61C 7/14 |
| 2019/0192258 A1* | 6/2019 | Kang | G06F 3/12 |
| 2019/0231485 A1* | 8/2019 | Moon | A61C 7/20 |
| 2020/0000554 A1* | 1/2020 | Makarenkova | A61C 7/002 |
| 2020/0100866 A1* | 4/2020 | Medvinskaya | A61C 7/08 |
| 2020/0222158 A1* | 7/2020 | Coreil | A61C 13/235 |
| 2020/0289239 A1* | 9/2020 | Raby | A61C 7/002 |
| 2020/0375698 A1* | 12/2020 | Paehl | A61C 9/004 |
| 2021/0106403 A1* | 4/2021 | Aptekarev | A61C 7/002 |
| 2021/0133365 A1* | 5/2021 | Knight | G06F 30/17 |
| 2022/0047358 A1* | 2/2022 | Domroese | B33Y 80/00 |
| 2022/0222910 A1* | 7/2022 | Salah | G06T 17/00 |
| 2022/0257340 A1* | 8/2022 | Dhinsa | G06T 7/74 |
| 2022/0409343 A1* | 12/2022 | Sato | A61C 7/14 |
| 2023/0000594 A1* | 1/2023 | Kim | A61C 7/08 |
| 2023/0293264 A1* | 9/2023 | Shojaei | G16H 20/30 |
| | | | 345/419 |
| 2023/0293266 A1* | 9/2023 | Jensen | A61C 7/006 |
| | | | 433/6 |
| 2023/0363856 A1* | 11/2023 | Huang | A61C 7/002 |

\* cited by examiner

METHOD AND COMPUTER PROGRAM FOR DESIGNING STRAIGHTENING ALIGNERS

TECHNICAL FIELD

The present invention relates to a method and computer program for designing straightening aligners, and more specifically, the present invention relates to a method and computer program for designing straightening aligners for manufacturing transparent straightening aligners used in dental orthodontic processes which are divided into multiple orthodontic steps to be performed.

BACKGROUND

Orthodontic treatment refers to a procedure that straightens crooked teeth and maloccluded teeth through straightening aligners. Orthodontic treatment may be classified into a method of using an orthodontic appliance made of metal brackets, a transparent orthodontic method of correction by mounting a transparent straightening aligner made of transparent materials on the teeth and the like.

Since the transparent orthodontic method is a method in which a transparent straightening aligner made of transparent materials is covered over the teeth like a mouthpiece, the straightening aligner is not visible from the outside, and since it is possible to attach or detach the straightening aligner, it has an advantage in which it is easy to manage the teeth during orthodontic treatment. For this reason, the transparent orthodontic method has been widely used in recent years.

Transparent orthodontics is performed by generating orthodontic alignment information divided into multiple orthodontic steps that are reached sequentially by correcting a patient's current tooth alignment information, and then making transparent straightening aligners corresponding to orthodontic alignment information for each orthodontic step to make the patient wear the transparent straightening aligners corresponding to each orthodontic step.

When operating a digital computer program for setting multiple orthodontic steps, a plurality of moving step data (set up data) are required. In one orthodontic step, when each tooth is moved by 1 mm, the orthodontic force applied to the corresponding tooth is 150 gw (gram weight). The optimal orthodontic force suggested by dental orthodontics is about 150 gw, and when multiple teeth are moved at the same time by 1 mm in one orthodontic step, the total sum of orthodontic forces applied to the multiple teeth exceeds 150 gw.

If, in one orthodontic step, the total orthodontic force, which is the sum of orthodontic forces applied to individual teeth, exceeds 500 to 700 gw, pain, tooth damage and the like may be induced. However, when designing transparent straightening aligners in the transparent orthodontic method, no technology has been introduced that takes into account the total sum of orthodontic forces applied to the patient's teeth in one orthodontic step.

SUMMARY

The present invention is to solve the aforementioned problems of the prior art, and an object of the present invention is to provide a method and computer program for designing straightening aligners that prevent pain, tooth damage and the like by considering the total sum of orthodontic forces applied to a patient's teeth in each orthodontic step, when designing transparent straightening aligners.

According to an aspect of the present invention, provided is a method for designing straightening aligners, including generating current alignment information representing a patient's current tooth alignment state, and generating orthodontic alignment information for multiple orthodontic steps that are reached sequentially by correcting the current alignment information, wherein generating the orthodontic alignment information sets the multiple orthodontic steps such that the total sum of orthodontic forces applied to the patient's teeth per one orthodontic step is less than or equal to a preset total sum of orthodontic forces in order to reach a tooth alignment state corresponding to the orthodontic alignment information of each orthodontic step.

In this case, the total sum of the orthodontic forces may be calculated by adding orthodontic forces applied to the patient's individual teeth in one orthodontic step.

In addition, the preset total sum of orthodontic forces may be selected from 500 to 700 gw.

In addition, generating the orthodontic alignment information may set the multiple orthodontic steps such that the total sum of orthodontic forces applied to the patient's teeth per one orthodontic step is less than or equal to the preset total sum of orthodontic forces, and the orthodontic force applied to the patient's individual teeth is also less than or equal to a preset individual orthodontic forces.

In addition, the preset individual orthodontic forces may be selected from 100 to 200 gw.

In addition, generating the orthodontic alignment information may set the multiple orthodontic steps such that the total sum of orthodontic forces applied to the patient's teeth per one orthodontic step is less than or equal to the preset total sum of orthodontic forces, and the movement distance of the patient's individual teeth is also less than or equal to a preset individual movement distance.

In addition, the preset individual movement distance may be selected from 0.5 to 1.5 mm.

In addition, generating the orthodontic alignment information may set the multiple orthodontic steps by setting the orthodontic force or movement distance of the patient's individual teeth per one orthodontic step to be a preset individual orthodontic forces or a preset individual movement distance such that when the total sum of orthodontic forces applied to the patient's teeth in the corresponding orthodontic step is more than the preset total sum of orthodontic forces, the orthodontic force or movement distance for the patient's individual teeth is reduced by a predetermined ratio.

In addition, the multiple orthodontic steps may include an orthodontic step in which the space between the teeth to be corrected is secured at maximum.

According to another aspect of the present invention, provided is a computer program for designing straightening aligners stored in a computer-readable storage medium for performing the method for designing straightening aligners.

According to an exemplary embodiment of the present invention, since the orthodontic steps are set such that the total sum of orthodontic forces applied to the patient's teeth per each orthodontic step is less than or equal to a preset total sum of orthodontic forces in the transparent orthodontic method, it is possible to prevent pain, tooth damage and the like in the orthodontic process.

DETAILED DESCRIPTION OF THE EMBODIMENTS

Hereinafter, with reference to the accompanying drawings, exemplary embodiments of the present invention will be described in detail so that those of ordinary skill in the art to which the present invention pertains can easily implement the same. The present invention may be embodied in many different forms and is not limited to the exemplary embodiments described herein. In order to clearly describe the present invention, parts which are irrelevant to the description are omitted from the drawings, and the same reference numerals are assigned to the same or similar components throughout the specification.

In the present specification, terms such as "include" or "have" are intended to describe the presence of features, numbers, steps, operations, components, parts or combinations thereof described in the specification, but it should be understood that it does not preclude the possibility of the presence or addition of one or more other features, numbers, steps, operations, components, parts or combinations thereof.

Figure 1:
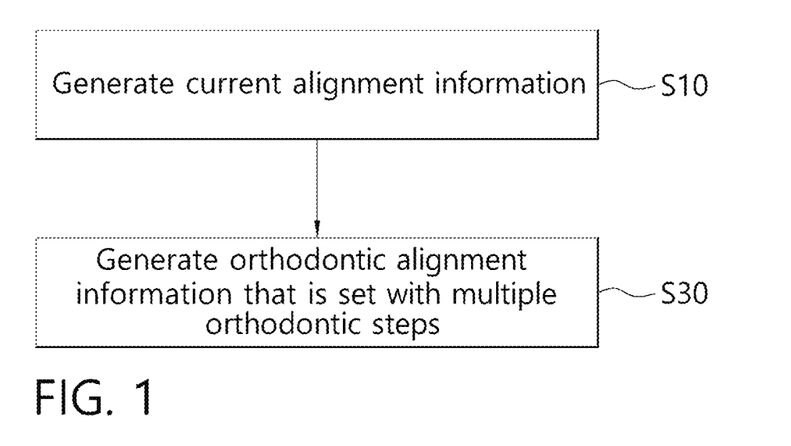
FIG. 1 is a flowchart of a method for designing straightening aligners according to an exemplary embodiment of the present invention.

FIG. 1 is a flowchart of a method for designing straightening aligners according to an exemplary embodiment of the present invention.

Transparent orthodontics generates orthodontic alignment information which is set in multiple orthodontic steps that are sequentially reached by correcting the current alignment information indicating the patient's current tooth alignment state, and then manufactures transparent straightening aligners corresponding to the orthodontic alignment information for each orthodontic step for the patient to sequentially wear the transparent straightening aligners corresponding to each orthodontic step.

The method for designing straightening aligners according to an exemplary embodiment of the present invention is for manufacturing transparent straightening aligners. In setting multiple orthodontic steps that are reached sequentially, the method for designing straightening aligners according to an exemplary embodiment of the present invention sets the multiple orthodontic steps such that the total sum of orthodontic forces applied to the patient's teeth per one orthodontic step is equal to or less than a preset total sum of orthodontic forces. Therefore, according to an exemplary embodiment of the present invention, it is possible to prevent side effects, such as pain, tooth damage and the like, from occurring during the transparent orthodontic process.

Referring to FIG. 1, the method for designing straightening aligners according to an exemplary embodiment of the present invention is performed by including the following steps.

First, generating current alignment information S10 is performed, which indicates the patient's current tooth alignment state. The current alignment information may be created by utilizing an X-ray image of the patient's teeth, front and side images of the patient, orthodontic instructions written by the attending dentist, an impression of the patient's teeth, the patient's 3D-scanned current tooth data and the like.

Figure 2:
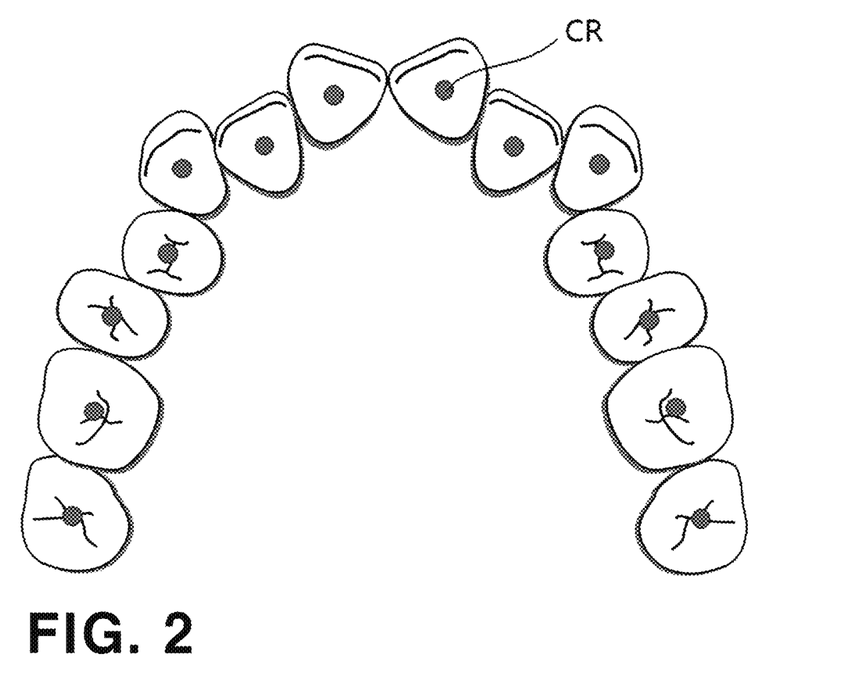
FIG. 2 is a diagram illustrating an example of current alignment information in the method for designing straightening aligners according to an exemplary embodiment of the present invention.

FIG. 2 is a diagram illustrating an example of current alignment information in the method for designing straightening aligners according to an exemplary embodiment of the present invention.

Referring to FIG. 2, the current alignment information may present an arrangement of the patient's current teeth and a center of rotation (CR) of each tooth.

Meanwhile, the patient's teeth may be divided into upper and lower jaws to identify a current alignment state. Accordingly, the current alignment information may include those relating to the upper jaw and the lower jaw.

Next, generating orthodontic alignment information S30 is performed by multiple orthodontic steps which are sequentially reached by correcting the current alignment information. In generating orthodontic alignment information S30, the multiple orthodontic steps may be set such that the total sum of orthodontic forces applied to the patient's teeth per one orthodontic step to reach the tooth alignment state corresponding to the orthodontic alignment information of each orthodontic step is less than or equal to a preset total sum of orthodontic forces.

In this case, the total sum of the orthodontic forces may be calculated by summing the orthodontic forces applied to the patient's individual teeth in one orthodontic step. In an exemplary embodiment of the present invention, the preset total sum of orthodontic forces may be selected from 500 to 700 gw (gram weight). For example, the preset total sum of orthodontic forces may be 500 gw.

The orthodontic force suggested as appropriate in orthodontics is 150 gw, and it is known that pain, tooth damage and the like are induced when the total sum of orthodontic forces, which is the sum of orthodontic forces applied to individual teeth, is more than 500 to 700 gw. The method for designing straightening aligners according to an exemplary embodiment of the present invention limits the preset total sum of orthodontic forces not to exceed a certain level based on these orthodontic facts.

In the multiple orthodontic steps, teeth to be corrected among the patient's teeth are moved or rotated. That is, the multiple orthodontic steps may be divided based on an arbitrary point in the process of moving or rotating the patient's teeth. In addition, the orthodontic alignment information of each orthodontic step may be obtained by moving or rotating the orthodontic target tooth that needs to be corrected in the current alignment information or the orthodontic alignment information of the previous step.

Meanwhile, in generating the orthodontic alignment information S30, the multiple orthodontic steps may be set such that the orthodontic force or movement distance per the patient's individual teeth per one orthodontic step is set to be a preset individual orthodontic forces or a preset individual movement distance. When the total sum of orthodontic forces applied to the patient's teeth in the corresponding orthodontic step is more than a preset total sum of orthodontic forces, the orthodontic force or movement distance per the patient's individual teeth may be reduced by a predetermined ratio.

For example, in one orthodontic step, individual teeth to be corrected may be set to move by 1 mm. In this case, the orthodontic force applied to the corresponding tooth when the tooth is moved by 1 mm may be calculated as 150 gw. When there are many teeth to be corrected and the total sum of the orthodontic forces exceeds 500 gw, one orthodontic step may be set by reducing the movement distance per individual tooth. If the total sum of orthodontic forces is expected to be 600 gw, it is possible to reduce the movement distance of each tooth by 20% such that the total sum does not exceed 500 gw. Accordingly, the total number of orthodontic steps may be increased.

Meanwhile, in generating the orthodontic alignment information S30, the multiple orthodontic steps may be set such that the total sum of orthodontic forces applied to the patient's teeth per one orthodontic step is less than or equal to the preset total sum of orthodontic forces, and the orthodontic force applied to the patient's individual teeth is also less than or equal to a preset individual orthodontic forces For example, the preset individual orthodontic forces may be selected from 100 to 200 gw.

Meanwhile, in generating the orthodontic alignment information S30, the multiple orthodontic steps may be set such that the total sum of orthodontic forces applied to the patient's teeth per one orthodontic step is less than or equal to the preset total sum of orthodontic forces, and the movement distance of the patient's individual teeth is also less than or equal to a preset individual movement distance.

In addition, the preset individual movement distance may be selected from 0.5 to 1.5 mm.

The method for designing straightening aligners according to an exemplary embodiment of the present invention may be performed by a computer device. For example, the method for designing straightening aligners according to an exemplary embodiment of the present invention may be performed automatically by a computer device.

When the method for designing straightening aligners according to an exemplary embodiment of the present invention is performed by a computer device, the number of steps to divide the multiple orthodontic steps into may be automatically set by software. In addition, the preset total sum of orthodontic forces may be corrected in the control panel (commander board) of the computer device.

Figure 3:
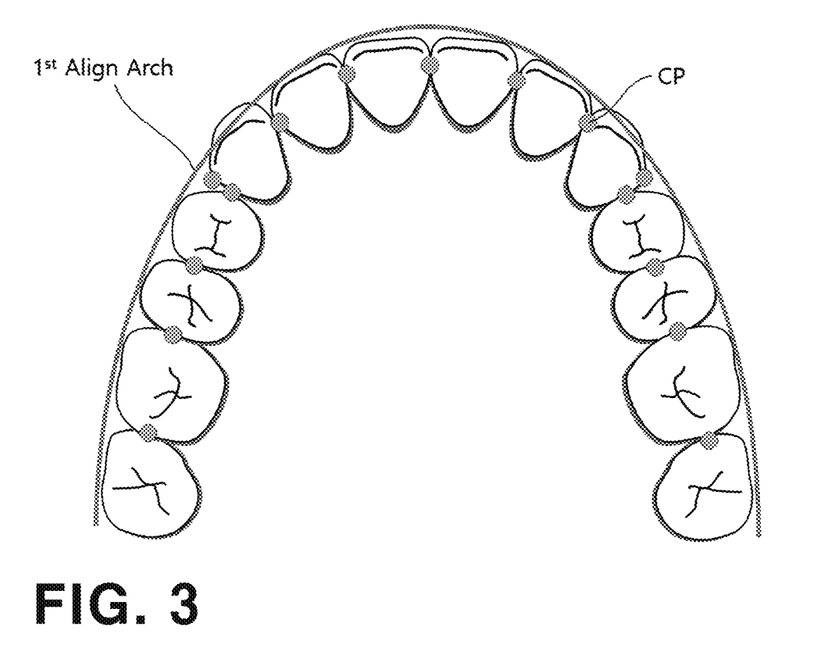
FIG. 3 is a diagram illustrating an example of orthodontic alignment information corresponding to the last orthodontic step among multiple orthodontic steps in the method for designing straightening aligners according to an exemplary embodiment of the present invention.
Figure 4:
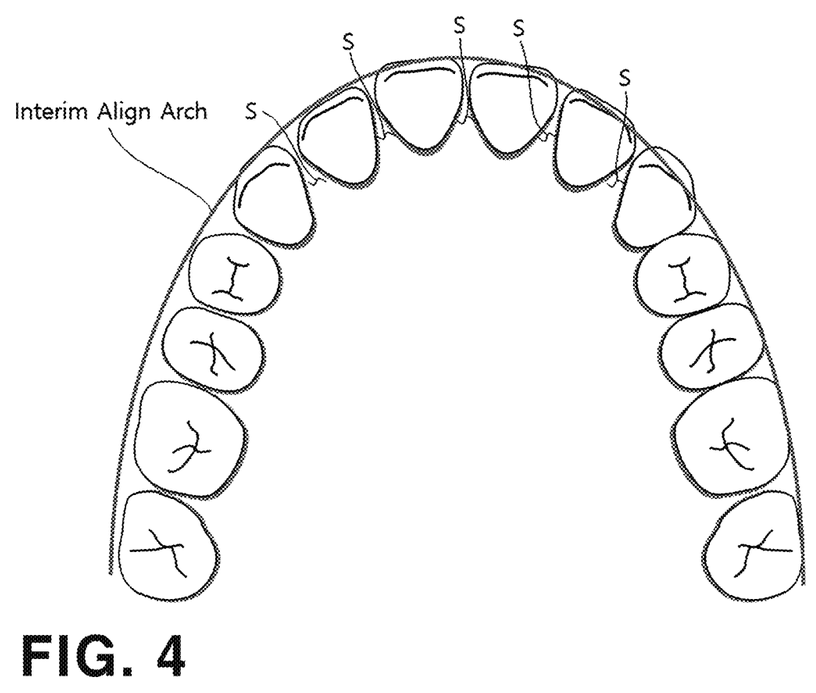
FIG. 4 is a diagram illustrating an example of orthodontic alignment information corresponding to an orthodontic step in which the space between teeth to be corrected is secured at maximum among multiple orthodontic steps in the method for designing straightening aligners according to an exemplary embodiment of the present invention.

FIG. 3 is a diagram illustrating an example of orthodontic alignment information corresponding to the last orthodontic step among multiple orthodontic steps in the method for designing straightening aligners according to an exemplary embodiment of the present invention, and FIG. 4 is a diagram illustrating an example of orthodontic alignment information corresponding to an orthodontic step in which the space between teeth to be corrected is secured at maximum among multiple orthodontic steps in the method for designing straightening aligners according to an exemplary embodiment of the present invention.

Referring to FIG. 3, in the last orthodontic step among the multiple orthodontic steps, the teeth may be positioned to form a final align arch ($1^{st}$ Align Arch). Herein, the final orthodontic step means a state in which the correction is completed when cutting of the teeth is not required, and when additional cutting of the teeth is required after alignment, it refers to a state in which the teeth are aligned just before cutting. Meanwhile, the orthodontic alignment information corresponding to the last orthodontic step may present a contact point (CP) between the patient's teeth.

In order for the teeth to form a final align arch (Is Align Arch) and to be aligned through the multiple orthodontic steps, a space for moving and rotating the teeth to be corrected during the orthodontic process is required. In other words, the multiple orthodontic steps include a process of expanding the teeth to be corrected such that a space for moving and rotating the teeth to be corrected is secured in the current tooth alignment state, and a process of retracting the teeth to be corrected to form a final align arch ($1^{st}$ Align Arch) to be arranged after expansion Therefore, in an exemplary embodiment of the present invention, the multiple orthodontic steps include an orthodontic step in which the space between the teeth to be corrected is secured at maximum. In other words, the first part of the multiple orthodontic steps may correspond to a process of forming an interim align arch, and the second half of the multiple orthodontic steps may correspond to a process of moving the teeth forming the interim align arch to form a final align arch (1st Align Arch).

FIG. 4 is a diagram illustrating an example of orthodontic alignment information corresponding to an orthodontic step in which the space between teeth to be corrected is secured at maximum among multiple orthodontic steps in the method for designing straightening aligners according to an exemplary embodiment of the present invention.

Referring to FIG. 4, in the orthodontic step in which the space S between the teeth to be corrected is secured at maximum, the patient's teeth are arranged to form an interim align arch. The space S between the teeth to be corrected in this step allows the teeth to be corrected to be rotated or moved (returned) such that the patient's teeth form a final align arch ($1^{st}$ Align Arch) and are aligned.

For example, in an exemplary embodiment of the present invention, the interim align arch may be located 1 to 3 mm outside the final align arch ($1^{st}$ Align Arch).

Figure 5:
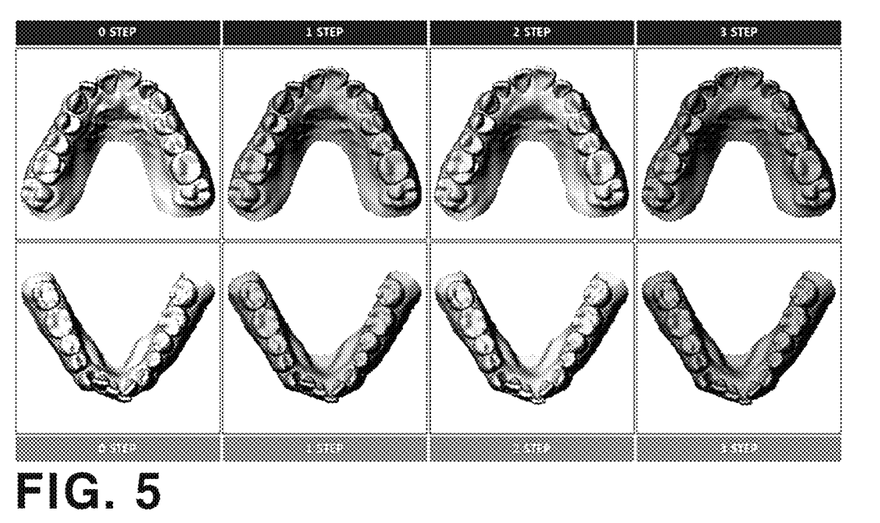
FIGS. 5 and 6 are diagrams illustrating examples of orthodontic alignment information which is set in multiple orthodontic steps in the method for designing straightening aligners according to an exemplary embodiment of the present invention.
Figure 6:
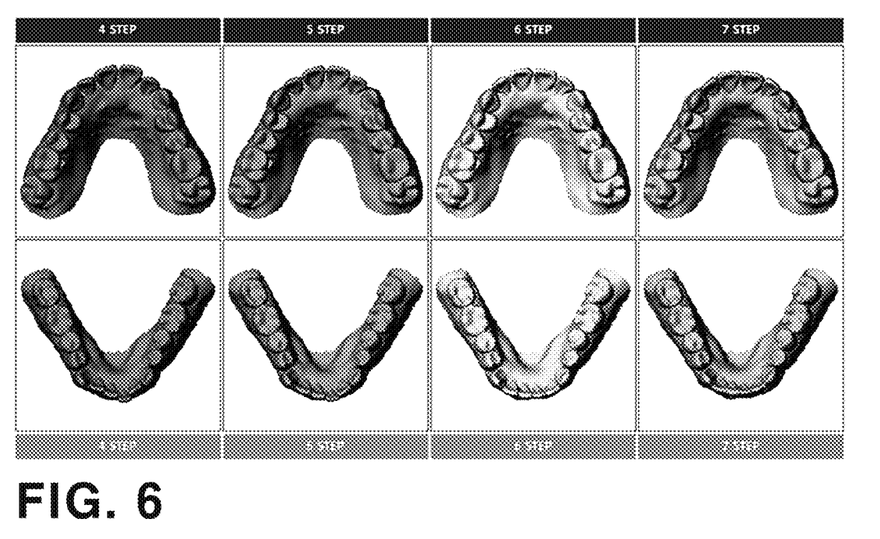

FIGS. 5 and 6 are diagrams illustrating examples of orthodontic alignment information which is set in multiple orthodontic steps in the method for designing straightening aligners according to an exemplary embodiment of the present invention.

In FIGS. 5 and 6, the upper row represents orthodontic alignment information of the lower jaw, and the lower row represents orthodontic alignment information of the upper jaw. Also, in FIG. 5, the upper and lower leftmost columns (STEP 0) correspond to current alignment information, and a plurality of orthodontic alignment information are set and divided into a total of 7 steps (STEPS 1 to 7).

Meanwhile, in the last orthodontic step (STEP 7), the teeth of the lower jaw and the upper jaw may be arranged to form a final align arch ($1^{st}$ Align Arch), respectively. Also, in the intermediate orthodontic step (e.g., STEP 4 or STEP 5), the teeth of the lower jaw and the upper jaw may be arranged to form an interim align arch, respectively.

Orthodontic alignment information which is set in multiple orthodontic steps is utilized to manufacture transparent straightening aligners. More specifically, transparent straightening aligners may be made for each orthodontic step to correspond to the orthodontic alignment information of each orthodontic step.

For example, a mold may be manufactured to correspond to the orthodontic alignment information of each orthodontic step, and a transparent straightening aligner may be made through the mold. In addition, it is possible to make a transparent straightening aligner through 3D printing based on the orthodontic alignment information of each orthodontic step.

The patient wears a transparent straightening aligner corresponding to the first orthodontic alignment information, and when the teeth have the alignment corresponding to the first orthodontic alignment information, the patient wears a transparent straightening aligner corresponding to the second orthodontic alignment information. By continuing this process until the last orthodontic step, that is, until the teeth have an alignment corresponding to the last orthodontic alignment information, the patient's teeth may finally reach the target alignment.

The method for designing straightening aligners according to an exemplary embodiment of the present invention may be recorded in a computer-readable medium made in the form of a computer program instruction that may be executed through various computer means. That is, the present invention provides a computer program for designing straightening aligners together.

The computer program for designing straightening aligners according to an exemplary embodiment of the present invention may store generating current alignment information S10 indicating the patient's current tooth alignment state and generating orthodontic alignment information S30 which is set in multiple orthodontic steps that are sequentially reached by correcting the current alignment information on a computer-readable device.

Generating current alignment information S10 and generating orthodontic alignment information S30 are the same as those described in relation to the method for designing straightening aligners according to an exemplary embodiment of the present invention Meanwhile, the computer-readable medium may include any one or more of computer program instructions and data structures. For example, the computer-readable recording medium may be a hardware device particularly configured to store and execute computer program instructions such as magnetic media such as a hard disk, optical media such as CD-ROM and DVD, magneto-optical media such as a floptical disk, a flash memory and the like.

According to an exemplary embodiment of the present invention, since the orthodontic steps are set such that the total sum of orthodontic forces applied to the patient's teeth per each orthodontic step is less than or equal to a preset total sum of orthodontic forces in the transparent orthodontic method, it is possible to prevent pain, tooth damage and the like in the orthodontic process.

Although exemplary embodiments of the present invention have been described, the spirit of the present invention is not limited by the exemplary embodiments presented in this specification, and those skilled in the art who understand the spirit of the present invention will be able to easily suggest other exemplary embodiments by supplementing, changing, deleting or adding components within the scope of the same spirit. However, it is to be said that this will also fall within the scope of the present invention.

What is claimed is:

1. A method for designing straightening aligners, comprising:
    generating current alignment information representing a current tooth alignment state of a patient; and
    generating orthodontic alignment information for multiple orthodontic steps, wherein the multiple orthodontic steps are reached sequentially by correcting the current alignment information, wherein the step of generating the orthodontic alignment information sets the multiple orthodontic steps to make a total sum of orthodontic forces applied to teeth of the patient per one orthodontic step less than or equal to a preset total sum of the orthodontic forces in order to reach a tooth alignment state corresponding to the orthodontic alignment information of each of the multiple orthodontic steps, and wherein the multiple orthodontic steps include
    expanding teeth to be corrected;
    forming an interim align arch such that a space for moving and rotating the teeth to be corrected is secured;
    retracting the teeth to be corrected; and
    forming a final align arch such that the teeth to be corrected are contacted each other at a contact point, and
    wherein the interim align arch is located outside the final align arch.

2. The method of claim 1, wherein the total sum of the orthodontic forces is calculated by adding orthodontic forces applied to an individual tooth of the patient in one orthodontic step.

3. The method of claim 1, wherein the preset total sum of the orthodontic forces is selected from 500 to 700 gw.

4. The method of claim 1, wherein the step of generating the orthodontic alignment information sets the multiple orthodontic steps to further make an orthodontic force applied to an individual tooth of the patient less than or equal to a preset individual orthodontic force.

5. The method of claim 4, wherein the preset individual orthodontic force is selected from 100 to 200 gw.

6. The method of claim 1, wherein the step of generating the orthodontic alignment information sets the multiple orthodontic steps to further make a movement distance of an individual tooth of the patient less than or equal to a preset individual movement distance.

7. The method of claim 6, wherein the preset individual movement distance is selected from 0.5 to 1.5 mm.

8. The method of claim 1, wherein the step of generating the orthodontic alignment information sets the multiple orthodontic steps by setting an orthodontic force or a movement distance of an individual tooth of the patient per one orthodontic step to be a preset individual orthodontic force or a preset individual movement distance, wherein when the total sum of the orthodontic forces applied to the teeth of the patient in a corresponding orthodontic step is more than the preset total sum of the orthodontic forces, the orthodontic force or the movement distance for the individual tooth of the patient is reduced by a predetermined ratio.

9. The method of claim 1, wherein the multiple orthodontic steps comprise an orthodontic step, wherein a space between the teeth to be corrected is secured at maximum.

10. A non-transitory computer-readable storage medium storing instructions that, when executed by a processor, cause the processor to perform method for designing the straightening aligners, and the method comprises the following steps:
    generating current alignment information representing a current tooth alignment state of a patient; and
    generating orthodontic alignment information for multiple orthodontic steps, wherein the multiple orthodontic steps are reached sequentially by correcting the current alignment information,
    wherein the step of generating the orthodontic alignment information sets the multiple orthodontic steps to make a total sum of orthodontic forces applied to teeth of the patient per one orthodontic step less than or equal to a preset total sum of the orthodontic forces in order to reach a tooth alignment state corresponding to the orthodontic alignment information of each of the multiple orthodontic steps, and wherein the multiple orthodontic steps include, expanding teeth to be corrected;

forming an interim align arch such that a space for moving and rotating the teeth to be corrected is secured;

retracting the teeth to be corrected; and forming a final align arch such the teeth to be corrected are contacted each other at a contact point, and wherein the interim align arch is located outside the final align arch.

11. The non-transitory computer-readable storage medium of claim 10, wherein the total sum of the orthodontic forces is calculated by adding orthodontic forces applied to an individual tooth of the patient in one orthodontic step.

12. The non-transitory computer-readable storage medium of claim 10, wherein the preset total sum of the orthodontic forces is selected from 500 to 700 gw.

13. The non-transitory computer-readable storage medium of claim 10, wherein the step of generating the orthodontic alignment information sets the multiple orthodontic steps to further make an orthodontic force applied to an individual tooth of the patient less than or equal to a preset individual orthodontic force.

14. The non-transitory computer-readable storage medium of claim 13, wherein the preset individual orthodontic force is selected from 100 to 200 gw.

15. The non-transitory computer-readable storage medium of claim 10, wherein the step of generating the orthodontic alignment information sets the multiple orthodontic steps to further make a movement distance of an individual tooth of the patient less than or equal to a preset individual movement distance.

16. The non-transitory computer-readable storage medium of claim 15, wherein the preset individual movement distance is selected from 0.5 to 1.5 mm.

17. The non-transitory computer-readable storage medium of claim 10, wherein the step of generating the orthodontic alignment information sets the multiple orthodontic steps by setting an orthodontic force or a movement distance of an individual tooth of the patient per one orthodontic step to be a preset individual orthodontic force or a preset individual movement distance, wherein when the total sum of the orthodontic forces applied to the teeth of the patient in a corresponding orthodontic step is more than the preset total sum of the orthodontic forces, the orthodontic force or the movement distance for the individual tooth of the patient is reduced by a predetermined ratio.

18. The non-transitory computer-readable storage medium of claim 10, wherein the multiple orthodontic steps comprise an orthodontic step, wherein a space between the teeth to be corrected is secured at maximum.

* * * * *